(12) United States Patent
Fukushi

(10) Patent No.: US 11,042,206 B2
(45) Date of Patent: Jun. 22, 2021

(54) IMAGE FORMING APPARATUS, METHOD OF CONTROLLING IMAGE FORMING APPARATUS, AND STORAGE MEDIUM

(71) Applicant: CANON KABUSHIKI KAISHA, Tokyo (JP)

(72) Inventor: Kenji Fukushi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 287 days.

(21) Appl. No.: 15/966,442

(22) Filed: Apr. 30, 2018

(65) Prior Publication Data

US 2018/0321732 A1 Nov. 8, 2018

(30) Foreign Application Priority Data

May 8, 2017 (JP) .............................. JP2017-092382

(51) Int. Cl.
*G06K 9/00* (2006.01)
*G06F 1/3231* (2019.01)
(Continued)

(52) U.S. Cl.
CPC .......... *G06F 1/3231* (2013.01); *G06F 1/3284* (2013.01); *G06F 3/1204* (2013.01);
(Continued)

(58) Field of Classification Search
CPC ...... G06F 1/3231; G06F 1/3284; G06F 3/044; G06F 3/1204; G06F 3/1221;
(Continued)

(56) References Cited

U.S. PATENT DOCUMENTS 6,559,882 B1 * 5/2003 Kerchner ............. H05B 6/6435
    219/506
8,909,964 B2 * 12/2014 Narushima ........ G03G 15/5004
    713/320
(Continued)

FOREIGN PATENT DOCUMENTS

CN     103489415 A     1/2014
CN     104917920 A     9/2015
(Continued)

OTHER PUBLICATIONS

Notice of Reasons for Refusal issued by the Japanese Patent Office dated Apr. 16, 2019 in corresponding Japanese Patent Application No. 2017-092382, with English translation.
(Continued)

*Primary Examiner* — Shefali D Goradia
(74) *Attorney, Agent, or Firm* — Carter, DeLuca & Farrell LLP

(57) ABSTRACT

An image forming apparatus of the present invention includes a human detection unit configured to detect a human, an operation unit including a display device configured to display an operation screen, a touch panel configured to detect a touch operation of the operation screen, a control unit configured to return the operation unit from a first power state in which the display device does not display the operation screen to a second power state in which the display device displays the operation screen based on a detection result of the human detection unit, and an invalidation unit configured to invalidate a touch operation of the operation screen for a predetermined period after the returning starts.

17 Claims, 11 Drawing Sheets

(51) Int. Cl.
　　*G06F 1/3234*　　(2019.01)
　　*G06K 15/00*　　(2006.01)
　　*G06F 3/12*　　(2006.01)

(52) U.S. Cl.
　　CPC .......... *G06F 3/1221* (2013.01); *G06F 3/1229* (2013.01); *G06F 3/1279* (2013.01); *G06K 9/00362* (2013.01); *G06K 15/406* (2013.01)

(58) Field of Classification Search
　　CPC . G06F 3/1229; G06F 3/1279; G06K 9/00362; G06K 15/406
　　See application file for complete search history.

(56) References Cited

U.S. PATENT DOCUMENTS

| | | | | |
|---|---|---|---|---|
| 9,128,648 | B2* | 9/2015 | Kawaguchi | G06F 3/1221 |
| 2013/0073887 | A1* | 3/2013 | Miki | G06F 1/3287 |
| | | | | 713/323 |
| 2014/0094224 | A1* | 4/2014 | Lozovoy | G06F 1/3209 |
| | | | | 455/566 |
| 2015/0153973 | A1* | 6/2015 | Kawaguchi | G05B 15/02 |
| | | | | 358/1.14 |
| 2015/0277576 | A1* | 10/2015 | Sueishi | G06F 3/016 |
| | | | | 345/174 |
| 2016/0150111 | A1* | 5/2016 | Sakamoto | H04N 1/00891 |
| | | | | 358/1.13 |
| 2017/0104921 | A1* | 4/2017 | Yoshida | H04N 5/23241 |
| 2018/0253185 | A1* | 9/2018 | Imanilov | G06F 3/044 |

FOREIGN PATENT DOCUMENTS

| | | |
|---|---|---|
| JP | 2005135306 A | 5/2005 |
| JP | 2013-109196 A | 6/2013 |
| JP | 2013190701 A | 9/2013 |
| JP | 2015104852 A | 6/2015 |
| JP | 6091693 B1 | 3/2017 |
| JP | 2018187848 A | 11/2018 |

OTHER PUBLICATIONS

Notice of the First Office Action issued by the National Intellectual Property Administration of the People's Republic of China dated Sep. 6, 2019 in corresponding Chinese Patent Application No. 201810434264.6, with English translation.

Notice of Reasons for Refusal issued by the Japanese Patent Office dated Aug. 13, 2019 in corresponding Japanese Patent Application No. 2017-092382, with English translation.

Notice of Reasons for Refusal issued by the Japan Patent Office dated Feb. 9, 2021 in corresponding JP Patent Application No. 2019-238591, with English translation.

* cited by examiner

IMAGE FORMING APPARATUS, METHOD OF CONTROLLING IMAGE FORMING APPARATUS, AND STORAGE MEDIUM

BACKGROUND OF THE INVENTION

Field of the Invention

The present invention relates to an image forming apparatus having a touch panel capable of detecting a user's operation and a human detection sensor capable of detecting a user's presence, a method of controlling the image forming apparatus, and a storage medium.

Description of the Related Art

As a device that operates by switching between a normal state and a standby state, for example, an image forming apparatus is known in the art, in which the operation switches between a normal power state and a power saving state having a power consumption smaller than that of the normal power state. In this state switching type image forming apparatus, the human detection sensor mounted on the apparatus detects a user who approaches the apparatus, and a function of starting the process of returning from the power saving state to the normal power state in response to this detection is implemented. Japanese Patent Laid-Open No. 2013-109196 proposes an image processing device that is configured to be capable of adjusting the detection distance of the human detection sensor. In the image processing device proposed in Japanese Patent Laid-Open No. 2013-109196, a person who approaches the apparatus can be detected faster by lengthening the detection distance of the human detection sensor, so that a standby time that a user feels is shortened.

As the touch panel is popularized in recent years, an image forming apparatus that detects an input to a button of the operation screen (a so-called soft key) on the touch panel has been provided. In the state switching type image forming apparatus, a function of starting the process of returning from the power saving state to the normal power state by the user who touches the touch panel is also implemented.

SUMMARY OF THE INVENTION

The present invention aims to provide a technique that suppresses reduction of work efficiency in using an image forming apparatus that recognizes two-channel returning factors including detection of a human detection sensor and detection of a touch panel.

According to an aspect of the present invention, there is provided an image forming apparatus including: a human detection unit configured to detect a human; an operation unit including a display device configured to display an operation screen; a touch panel configured to detect a touch operation of the operation screen; a control unit configured to return the operation unit from a first power state in which the display device does not display the operation screen to a second power state in which the display device displays the operation screen based on a detection result of the human detection unit; and an invalidation unit configured to invalidate a touch operation of the operation screen for a predetermined period after the returning starts.

Further features of the present invention will become apparent from the following description of exemplary embodiments with reference to the attached drawings.

DESCRIPTION OF THE EMBODIMENTS

In an image forming apparatus that recognizes two-channel returning factors including detection of a human detection sensor and detection of a touch panel, in a case where an operation not intended by a user is input, work efficiency of the image forming apparatus may be degraded in some cases.

Specifically, the following use case may be anticipated. As a user approaches the image forming apparatus with a rapid walk, the returning process has not been completed in a case where the user arrives in front of the image forming apparatus in some cases. In a case where the returning process has not been completed, and no screen is displayed on the touch panel, the user may urge the returning process by touching any portion of the touch panel. In a case where the timing that the user touches the touch panel is timing immediately after the start of a screen display on the touch panel, an operation onto the button immediately after the display on the touch panel starts is received erroneously. As a result, for example, in a case where a button for instructing to advancing to the power saving state is manipulated, the image forming apparatus immediately after returning to the normal power state may start the process of transition to the power saving state again in some cases. That is, in a case where a process corresponding to an operation not intended by a user is executed, a user may suffer from an unnecessary standby time or the like. This may degrade work efficiency in the image forming apparatus in some cases.

Embodiments of the present invention will be described with reference to the accompanying drawings. Note that the configurations described in the embodiments are just for illustrative purposes, and are not intended to limit the scope of the present invention.

Embodiment 1

(Image Forming Apparatus)

Figure 1:
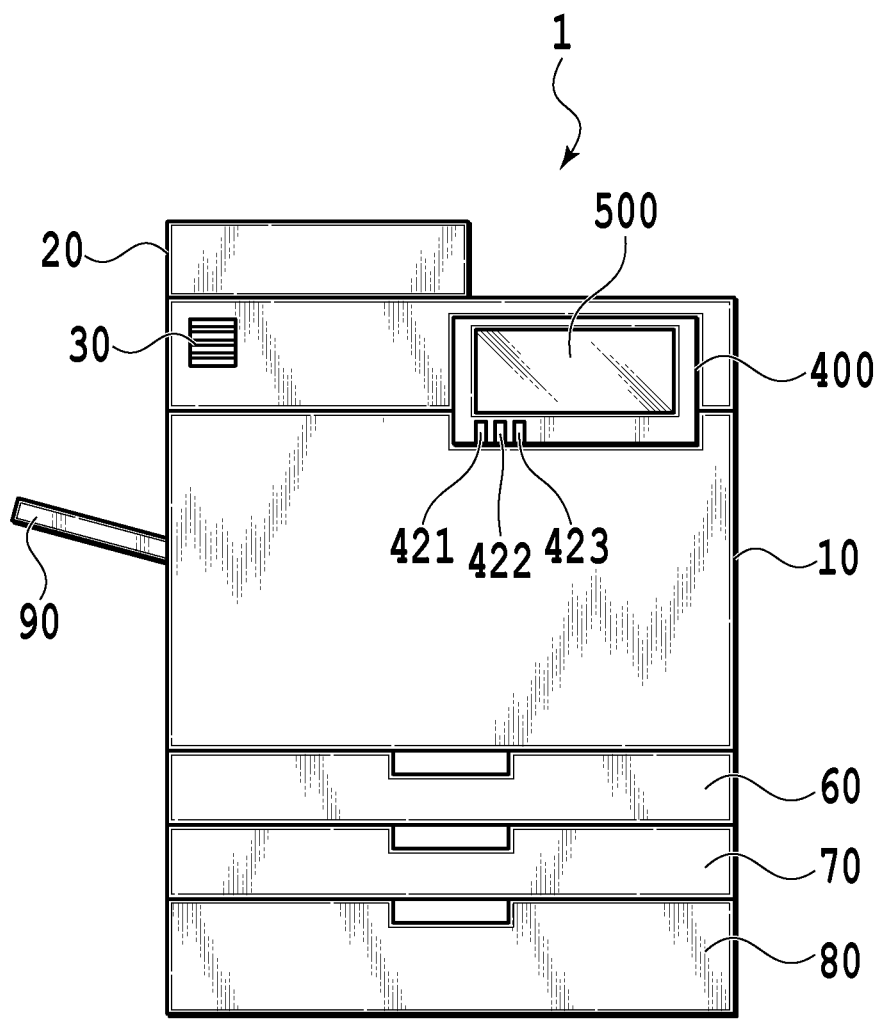
FIG. 1 is a diagram illustrating an exterior example of an image forming apparatus according to Embodiment 1.

FIG. 1 is a diagram illustrating an exterior example of the image forming apparatus 1 according to the present embodiment. FIG. 1 illustrates exterior appearance of the image forming apparatus 1 as the image forming apparatus 1 is seen from the front side. The image forming apparatus 1 illustrated in FIG. 1 includes an image formation unit 10, an image reading unit 20, a human detection sensor 30, an operation unit 400, and sheet feeding units 60, 70, and 80. The image forming apparatus 1 according to the present embodiment is a multi-function peripheral (MFP) having a copy function or a print function. The image reading unit 20 creates an original image by optically reading originals placed on a reading bed. The image formation unit 10 is supplied with sheets from the sheet feeding units 60 to 80 and forms (outputs) an image on the supplied sheet. The sheet having an image formed thereon by the image formation unit 10 is discharged to a print sheet tray 90. In addition, the image formation unit 10 can receive a print job from an external device (not illustrated) via a network and form an image on the sheet on the basis of the received print job. Note that the number of the sheet feeding stages, a sheet discharge direction, and the like are not limited to those of the present embodiment (FIG. 1).

The human detection sensor 30 according to the present embodiment is embedded to the upper left side of the image forming apparatus 1 as the image forming apparatus 1 is seen from the front. A cover that covers the human detection sensor 30 has slits, so that the human detection sensor 30 can output an ultrasound wave to the front direction of the image forming apparatus 1 through the slits. The human detection sensor 30 outputs a detection signal in a case where it detects a reflection wave of the output ultrasound wave. That is, the human detection sensor 30 is an ultrasound type detection sensor. Other types of sensors may also be employed as the human detection sensor 30. For example, an infrared sensor that can detect ambient temperature may be employed as the human detection sensor 30. In addition, an arrangement position of the human detection sensor 30 is not limited to the upper left side of the image forming apparatus 1 as the image forming apparatus 1 is seen from the front.

The operation unit 400 according to the present embodiment is arranged in the upper right side of the image forming apparatus 1 as the image forming apparatus 1 is seen from the front. The operation unit 400 has LEDs 421, 422, and 423 that indicate a power state or operation state of the image forming apparatus 1. In addition, the operation unit 400 has a touch panel 500 for receiving an operation input from a user. The touch panel 500 according to the present embodiment is an electric resistance type, but other types of touch panels such as an electrostatic capacitance type or an optical type may also be employed. A display device underlies the touch panel 500. According to the present embodiment, a liquid crystal display (LCD) described below is employed as the display device. Note that the arrangement position of the operation unit 400 is not limited to the upper right side of the image forming apparatus 1 as the image forming apparatus 1 is seen from the front.

(Control Block Diagram)

Figure 2:
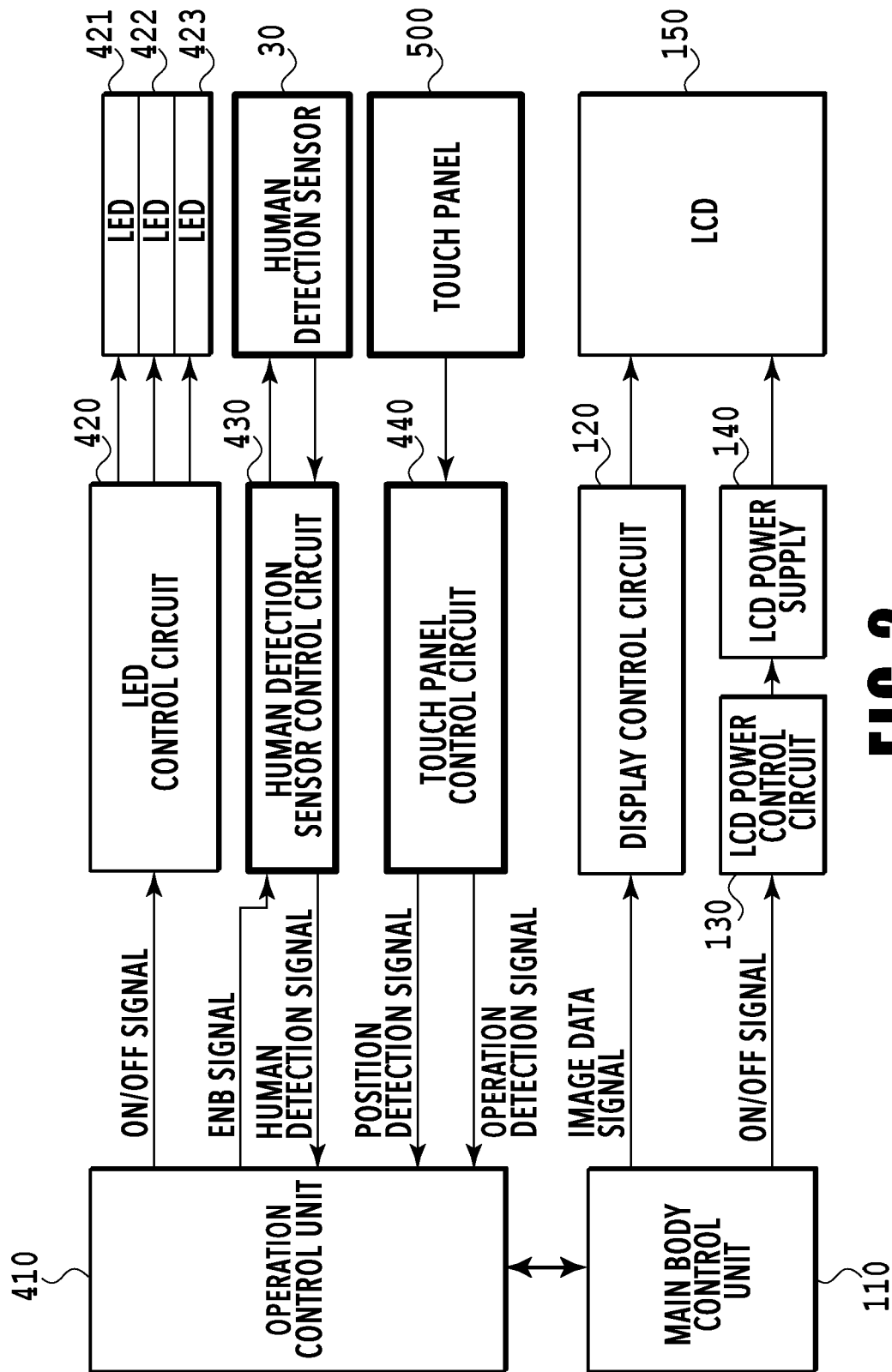
FIG. 2 is a block diagram illustrating a signal processing sequence according to Embodiment 1.

FIG. 2 is a block diagram illustrating a signal processing sequence mainly in the operation unit 400 according to the present embodiment. The operation control unit 410 is an integrated circuit such as a microcomputer in which a program for controlling the operation unit 400 is stored. Similarly, according to the present embodiment, an LED control circuit 420, a human detection sensor control circuit 430, and a touch panel control circuit 440 are also embedded in the integrated circuit. The operation control unit 410 controls the operations of the LEDs 421 to 423, the human detection sensor 30, and the touch panel 500 while performing signal input and/or output operations with each control circuit. In addition, the operation control unit 410 can also perform signal input and/or output operations with the main body control unit 110. The configuration of the control block is not limited to that of FIG. 2. For example, the operation control unit 410 and the main body control unit 110 may be embedded in the same integrated circuit. Similarly, the LED control circuit 420, the human detection sensor control circuit 430, and the touch panel control circuit 440 may be embedded in the same integrated circuit.

Next, a light emission control of the LEDs 421 to 423 will be described. The operation control unit 410 outputs an ON (OFF) signal to the LED control circuit 420 as a signal indicating an instruction for turning on (off) the LEDs 421 to 423 is input from the main body control unit 110. The LED control circuit 420 according to the present embodiment is embedded in a switching circuit such as a transistor and performs supply (or shutdown) of power to the LEDs 421 to 423 in response to the ON (OFF) signal input from the operation control unit 410. In a case where the power is supplied, the LEDs 421 to 423 are turned on. In a case where the power is shut down, the LEDs 421 to 423 are turned off.

Next, a control of the human detection sensor 30 will be described. The human detection sensor 30 can detect whether or not an object such as a person exists within a predetermined detection range. As described above, the human detection sensor 30 according to the present embodiment is an ultrasound wave type detection sensor. The human detection sensor control circuit 430 starts to output a pulse wave in response to an ENB signal input from the operation control unit 410. The human detection sensor 30 outputs a pulse wave of approximately 40 kHz radially to the front of the image forming apparatus 1 on the basis of the pulse wave input from the human detection sensor control circuit 430. In addition, in a case where an object such as a person exists within a detection range, the human detection sensor 30 detects a reflection wave reflected from the object such as a person. The human detection sensor control circuit 430 outputs a human detection signal to the operation control unit 410 as the signal based on the reflection wave is input. The human detection signal is input from the human detection sensor control circuit 430, whereby the operation control unit 410 can detect an object such as a person present in front of the image forming apparatus 1. Note that, according to the present embodiment, through the processing based on a human determination algorithm described below, it is possible to determine whether or not the detected object such as a person is a person who approaches the image forming apparatus 1. In addition, the operation control unit 410 according to the present embodiment can estimate a distance from the image forming apparatus 1 to the object on the basis of a time difference from when the human detection sensor 30 outputs the pulse wave to when the reflected wave is detected. Furthermore, since the pulse wave is output from the human detection sensor 30 on a predetermined time interval basis, the operation control unit 410 can also detect movement of the object by monitoring the time difference at which the human detection sensor 30 detects the reflection wave. The control of the touch panel 500 will be described below with reference to FIG. 3 and subsequent drawings.

(Structure of Touch Panel)

Figure 3:
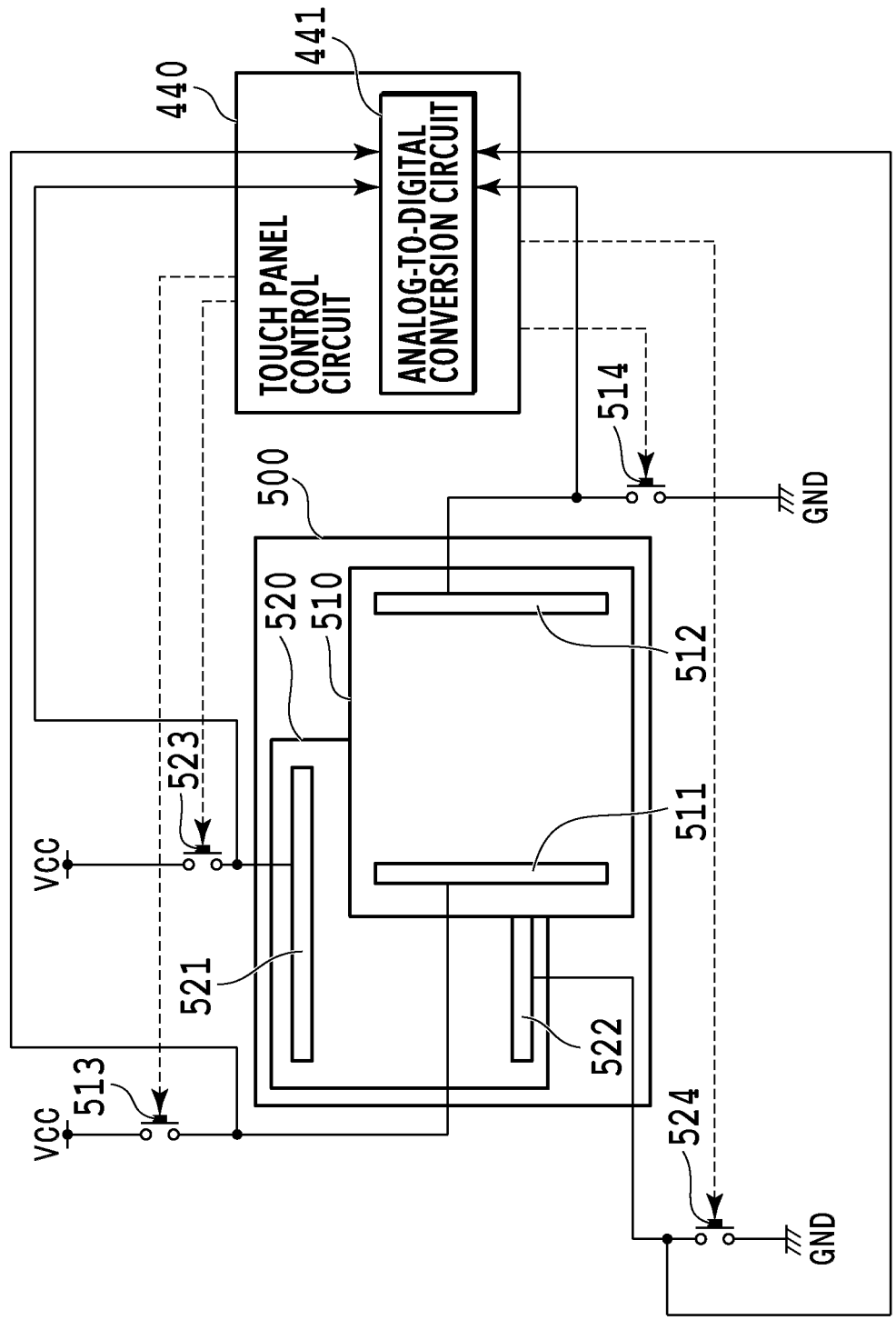
FIG. 3 is a diagram illustrating a structural example of a touch panel according to Embodiment 1.

FIG. 3 is a diagram illustrating a structural example of the touch panel 500 according to the present embodiment. The touch panel 500 according to the present embodiment is a so-called resistive type touch panel. The touch panel 500 has a pair of resistive films 510 and 520 formed of a transparent conductive film such as indium tin oxide (ITO). The resistive films 510 and 520 are formed on one side of a film such as glass or PET, and ITO surfaces of the resistive films 510 and 520 face each other. While a user does not manipulate the touch panel 500, an interval between the resistive films 510 and 520 is maintained by a spacer (not illustrated). While a user manipulates the touch panel 500, for example, while a user presses the touch panel 500 with his finger or the like, the resistive films 510 and 520 make contact with each other. An electrode of the resistive film 510 and an electrode of the resistive film 520 are arranged perpendicularly to each other. Specifically, as illustrated in FIG. 3, an XH-electrode 511 and an XL-electrode 512 are arranged in both ends of the cross direction (X-axis direction) of the resistive film 510. Meanwhile, an YH-electrode 521 and an YL-electrode 522 are arranged in both ends of the longitudinal direction (Y-axis direction) of the resistive film 520.

(Control of Touch Panel)

The XH-electrode 511 is connected to a power voltage Vcc through a switching element 513 such as a transistor. The XL-electrode 512 is connected to a ground potential through a switching element 514 such as a transistor. Similarly, the YH-electrode 521 is connected to the power voltage Vcc through a switching element 523 such as a transistor. The YL-electrode 522 is connected to a ground voltage through a switching element 524 such as a transistor. The touch panel control circuit 440 opens or closes the switching elements 513, 514, 523, and 524 and detects a voltage of an analog detection terminal connected to each electrode. An analog-to-digital conversion circuit 441 converts the detected analog voltage into a discrete value (digital conversion).

For example, in a case where an X-direction coordinate on the touch panel 500 is detected, a voltage is applied to the electrode of the resistive film 510. That is, the switching elements 513 and 514 are switched on, and an analog potential of the YH-electrode 521 is monitored by the touch panel control circuit 440. As a user presses the touch panel 500, the resistive films 510 and 520 make contact with each other. Therefore, a voltage applied by the XH-electrode 511 and the XL-electrode 512 is divided by the pressed position. This divided voltage is input to the analog-to-digital conversion circuit 441.

Similarly, in a case where the Y-direction coordinate on the touch panel 500 is detected, a voltage is applied to the electrode of the resistive film 520. That is, the switching elements 523 and 524 are switched on, and an analog potential of the XH-electrode 511 is monitored by the touch panel control circuit 440. As a user presses the touch panel 500, the resistive films 510 and 520 make contact with each other. Therefore, the voltage applied by the YH-electrode 521 and the YL-electrode 522 is divided on the pressed position. This divided voltage is input to the analog-to-digital conversion circuit 441. In this manner, the touch panel control circuit 440 alternately repeats voltage measurement of the YH-electrode 521 and voltage measurement of the) al-electrode 511, so that a change in the portion where a user performs operation on the touch panel 500 can be recognized.

Meanwhile, in a case where a user does not press the touch panel 500, the resistive films 510 and 520 do not make contact with each other. Therefore, no voltage is output from the YH-electrode 521 and the XH-electrode 511. As a result, since the touch panel control circuit 440 does not detect a voltage, it is recognized that a user does not press the touch panel 500. In a case where an operation on the touch panel 500 is recognized, the touch panel control circuit 440 outputs an operation detection signal indicating that an operation is performed on the touch panel 500 and a position detection signal output from the analog-to-digital conversion circuit 441 to the operation control unit 410. In this case, the position detection signal is transmitted via a communication path such as I2C, and the operation detection signal is transmitted via a communication path (signal line) different from that of the position detection signal. Then, the position detection signal input to the operation control unit 410 is converted into a coordinate data signal including an X-coordinate and a Y-coordinate in a case where the size of the touch panel 500 is shown in the XY-coordinate system.

(Communication Between Operation Control Unit and Main Body Control Unit)

Returning to FIG. 2 again, communication between the operation control unit 410 and the main body control unit 110 will be described. The operation control unit 410 outputs a human detection interrupt signal indicating that a person is detected on the basis of the output of the human detection sensor 30 to the main body control unit 110. Similarly, the operation control unit 410 outputs an operation detection interrupt signal indicating that the touch panel 500 is manipulated and a coordinate data signal indicating a position where an operation is performed on the touch panel 500 to the main body control unit 110. Meanwhile, the main body control unit 110 usually outputs a signal indicating a state of the main body (image formation unit 10) or a signal indicating a command for turning on (or off) the LEDs 421 to 423 to the operation control unit 410. Here, the state of the main body refers to, for example, a power state such as the normal power state (second power state) or the power saving state (first power state) in the image forming apparatus 1, an error occurrence state such as sheet jamming, or the like.

According to the present embodiment, the main body control unit 110 can control the operation of the LCD 150. In order to supply power to the LCD 150, the main body control unit 110 outputs an ON (OFF) signal to an LCD power control circuit 130. In addition, the main body control unit 110 outputs an image data signal to the display control circuit 120. The display control circuit 120 converts the image data signal into a signal complying with the standard of the LCD 150 and outputs it to the LCD 150. While the image forming apparatus 1 has a power saving state, no signal is input to the display control circuit 120 or the LCD power control circuit 130, and the backlight of the LCD 150 is maintained in the OFF state. For this reason, while the image forming apparatus 1 is operated in the power saving state, it is possible to reduce a power consumption, compared to the normal power state.

The main body control unit 110 generates the image data signal output to the display control circuit 120 in response to the coordinate data signal input from the operation control unit 410. For example, in a case where the main body control unit 110 receives the coordinate data signal indicating a position of the button displayed on the LCD 150 from the operation control unit 410, the image data signal necessary to display a screen after transition is generated. In addition, the main body control unit 110 continuously monitors the coordinate data signal input from the operation control unit 410. In a case where a movement of the coordinate is detected, the main body control unit 110 determines that flicking or sliding occurs on the touch panel 500. In this manner, the main body control unit 110 can generate the image data signal for screen display depending on flicking or sliding by monitoring an operation position on the touch panel 500.

(Returning Process by Setting Human Detection as Returning Factor)

Figure 4:
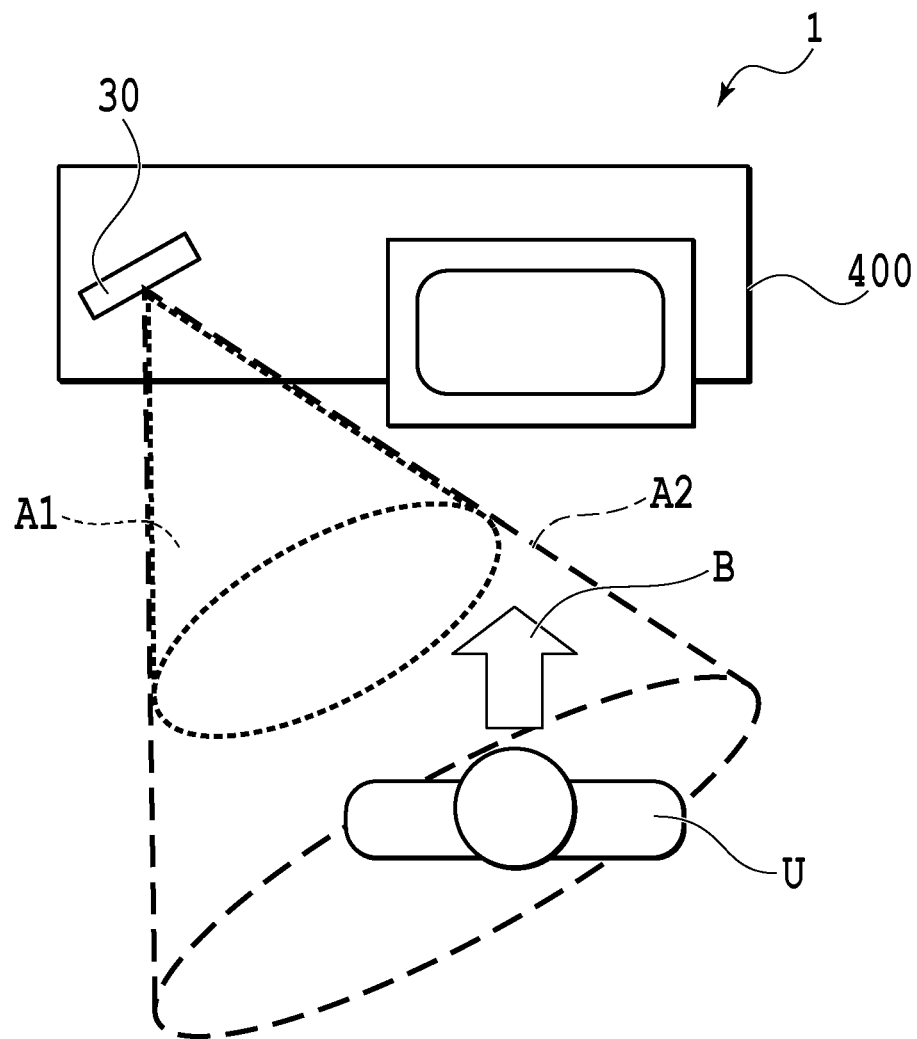
FIG. 4 is a schematic diagram illustrating how a user is detected according to Embodiment 1.

FIG. 4 is a schematic diagram illustrating how to detect a user U who approaches the image forming apparatus 1 using the human detection sensor 30. FIG. 4 is a top view obtained by viewing the image forming apparatus 1 and the user U from the top.

According to the present embodiment, sensitivity setting of the human detection sensor 30 is configured to be capable of switching. For example, the sensitivity of the human detection sensor 30 is configured to be capable of switching between two levels "strong" and "weak". As illustrated in FIG. 4, in a case where the sensitivity of the human detection sensor 30 is set to "weak", a detection range of the human detection sensor 30 becomes "A1". In a case where the sensitivity is set to "strong", the detection range of the human detection sensor 30 becomes "A2". Although the sensitivity of the human detection sensor 30 is set to two levels "strong" and "weak" in the present embodiment, the sensitivity may be set to three or more levels.

As illustrated in FIG. 4, in a case where the sensitivity of the human detection sensor 30 is set to "strong" (that is, in a case where the detection ration is set to A2), the human detection sensor 30 can detect presence of an object such as a person existing in the detection range A2. In this stage, it is difficult to specify whether the detected object such as a person is a person trying to manipulate the image forming apparatus 1 or a person who merely wants to pass over the image forming apparatus. For this reason, the operation control unit 410 according to the present embodiment determines whether or not an object such as a person detected by the human detection sensor 30 is a person who approaches the image forming apparatus 1 using a predetermined determination method. Various algorithms can be applied as the determination method. For example, the determination can be performed on the basis of a change of a distance between the human detection sensor 30 and the object such as a person with a predetermined time or on the basis of a time in which the distance between the human detection sensor 30 and the object such as a person is stagnant. In addition, in a case where the image forming apparatus 1 has the power saving state, and it is determined that a person (user U) approaches the image forming apparatus 1, the operation control unit 410 outputs the human detection interrupt signal to the main body control unit 110. The main body control unit 110 starts execution of a returning process necessary to return the image forming apparatus 1 from the power saving state to the normal power state, such as outputting a power supply instruction to each power control unit, in response to the input human detection interrupt signal. According to the present embodiment, in the returning process, the main body control unit 110 outputs the ON signal to the LCD power control circuit 130 and outputs the image data signal for an initial screen displayed on the LCD 150 immediately after the returning to the display control circuit 120.

(Returning Process by Setting Operation Detection as Returning Factor)

To the blocks indicated by the bold lines in FIG. 2, power is supplied even while the image forming apparatus 1 has the power saving state. For this reason, even in a case where the image forming apparatus 1 has the power saving state, the operation detection signal and the position detection signal detected by the touch panel 500 are input to the operation control unit 410.

In a case where the image forming apparatus 1 has the power saving state, and the position detection signal is input, the operation control unit 410 does not output the coordinate data signal, but outputs the operation detection interrupt signal indicating that an operation is performed on the touch panel 500 to the main body control unit 110. The main body control unit 110 starts execution of the returning process necessary to return the image forming apparatus 1 from the power saving state to the normal power state, such as outputting a power supply instruction to each power control unit, in response to the input operation detection interrupt signal. Even in the returning process by setting an operation on the touch panel 500 as a returning factor, the main body control unit 110 outputs the ON signal to the LCD power control circuit 130 and outputs the image data signal for displaying an initial screen displayed on the LCD 150 immediately after the returning to the display control circuit 120.

(Screen of Operation Unit)

Figure 5:
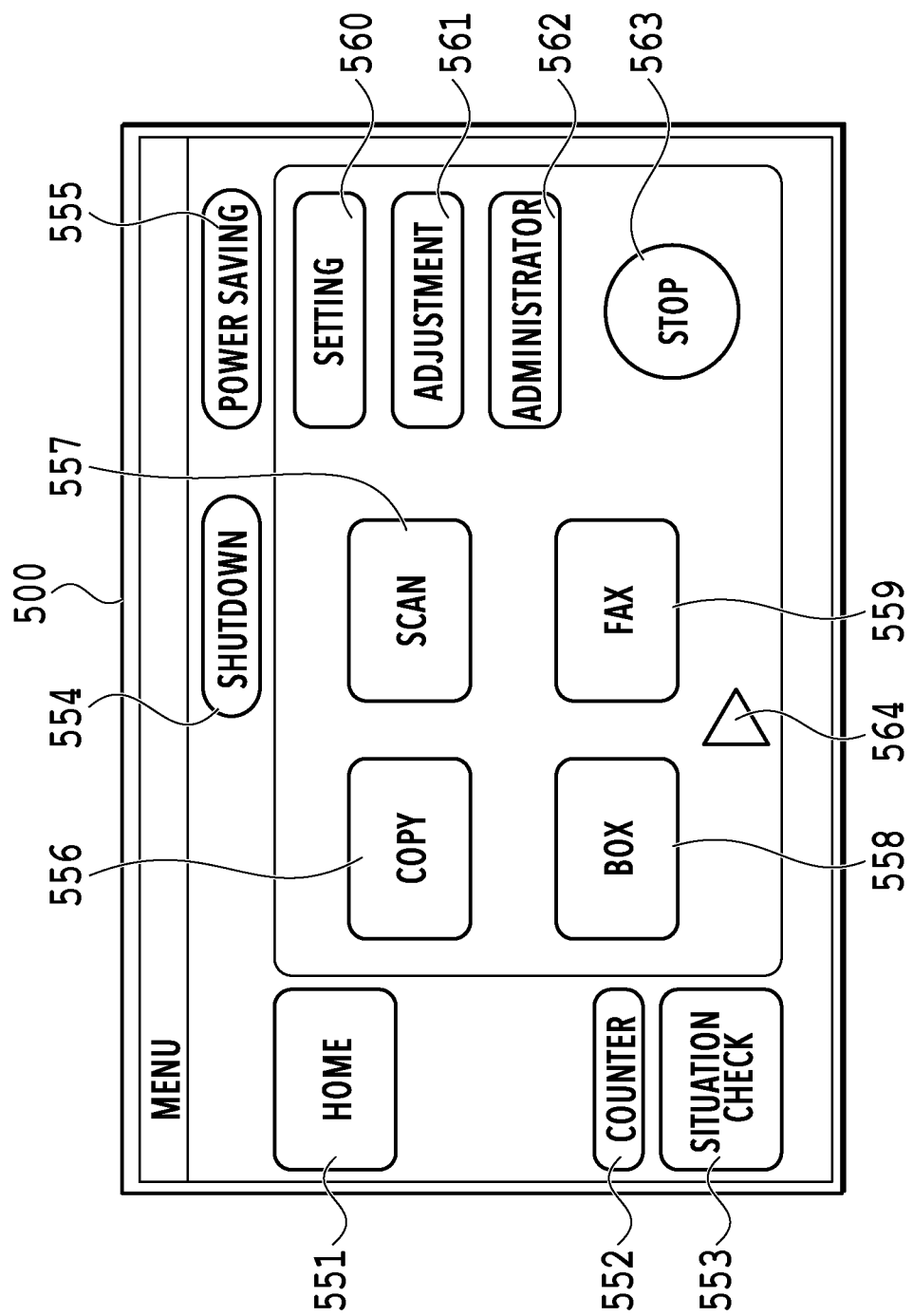
FIG. 5 is a diagram illustrating a screen example displayed on a touch panel according to Embodiment 1.

FIG. 5 is a diagram illustrating a screen example displayed on the touch panel 500 (LCD 150) according to the present embodiment. FIG. 5 illustrates an initial screen displayed on the touch panel 500 immediately after the image forming apparatus 1 is returned from the power saving state to the normal power state. The screen according to the present embodiment includes a plurality of button icons. A home button 551 is a user interface that receives an instruction for changing the display screen into a home screen. A counter button 552 is a user interface that receives an instruction for displaying the number of printed sheets on the display screen. A situation check button 553 is a user interface that receives an instruction for displaying a progression level of the print job on the display screen. A shutdown button 554 is a user interface that receives an instruction for shutting down the image forming apparatus 1. In response to pressing the shutdown button 554, a shutdown process for shutting down the image forming apparatus 1 starts. A power saving button 555 is a user interface that receives an instruction for advancing the image forming apparatus 1 to the power saving state. A copy button 556 is a user interface that receives an instruction for displaying a copy operation screen on the display screen. A scan button 557 is a user interface that receives an instruction for displaying a scan operation screen on the display screen. A BOX storing button 558 is a user interface that receives an instruction for displaying a BOX storing operation screen on the screen. Note that, according to the present embodiment, the BOX storing refers to a process of storing print data in a predetermined memory area of the image forming apparatus 1 or in an external device (storage device) connected to the image forming apparatus 1 via a network. A FAX button 559 is a user interface that receives an instruction for displaying a FAX operation screen on the display screen. A setting button 560 is a user interface that receives an instruction for displaying a device setting screen of the image forming apparatus 1 on the display screen. An adjustment button 561 is a user interface that receives an instruction for advancing the operation mode of the image forming apparatus 1 to an adjustment mode. An administrator button 562 is a user interface that receives an instruction for displaying an administrator screen. A STOP button 563 is a user interface that receives an instruction for stopping the process currently executed by the image forming apparatus 1. For example, in a case where a user U presses the STOP button 563 while the image forming apparatus 1 forms an image on the basis of a print job, a cancel process for canceling the image formation based on the print job is executed. An arrow button 564 is a user interface that receives an instruction for displaying a next operation screen on the display screen in a case where the screen of FIG. 5 has a plurality of operation screens. Although screens of the present embodiment have been described hereinbefore, the screens on FIG. 5 are merely for illustrative purposes, and the present invention is not limited by the types or number of buttons (user interfaces), arrangement of the buttons, or the like described above. A user U can call a desired screen or change the operation mode of the image forming apparatus 1 by pressing each of the button icons 551 to 564 displayed on the LCD 150 or flicking the screen of the touch panel 500.

(Control of Operation Unit)

As described above in conjunction with FIG. 4, in the image forming apparatus 1 according to the present embodiment, supply of power to the LCD 150 starts, and an initial screen is then displayed on the LCD 150 in the returning process from the power saving state by setting the human detection as a returning factor.

It is not preferable from the viewpoint of cost effectiveness to mount a human detection sensor capable of detecting all directions (360°) on the image forming apparatus 1. The human detection sensor 30 according to the present embodiment can detect only a front side of the image forming apparatus 1, and the detection range is limited to the detection range A2 of FIG. 4. For this reason, in the present embodiment, the timing of detecting a user U who approaches the image forming apparatus 1 from a cross direction or an oblique direction may be delayed. In addition, a user U may walk to the image forming apparatus 1 faster than an expected speed. In this case, the initial screen may be displayed on the LCD 150 after the user U arrives at a position where the operation unit 400 can be manipulated.

In a case where nothing is displayed on the operation unit 400 in a case where a user faces the image forming apparatus 1, it is predicted that a user urges the returning process from the power saving state by pressing any position on the touch panel 500. In a case where the initial screen is displayed on the touch panel 500 by the returning process having a returning factor set as human detection immediately after the user starts an operation on the touch panel 500, a finger or the like of the user may erroneously make contact with each of the buttons 551 to 563 on the screen. In this case, the main body control unit 110 analyzes that an operation instruction corresponding to each of the buttons 551 to 563 is input to the touch panel 500 as described above, and executes an operation corresponding to the operation instruction for in each unit of the image forming apparatus 1. For example, in a case where a user U touches the STOP button 563, the print operation under execution on the image formation unit 10 stops even in a case where the user U does not intend. Alternatively, in a case where a user U touches the power saving button 555, a transition process for transitioning the image forming apparatus 1 to the power saving state again starts even in a case where the user U desires to perform the operation using the image forming apparatus 1. That is, since a process corresponding to the operation not intended by the user U is executed, an unnecessary standby time may occur in the user U, and work efficiency in the image forming apparatus 1 may be degraded in some cases.

According to the present embodiment, the image forming apparatus 1 that recognizes two-channel returning factors including detection of the human detection sensor 30 and detection of the touch panel 500 suppresses degradation of work efficiency in the image forming apparatus 1 by performing various types of signal processing. The operation control unit 410 and the main body control unit 110 that perform various types of signal processing can be referred to as a signal processing device for controlling the image forming apparatus 1. The present invention will be described in detail with reference to FIG. 6.

Figure 6:
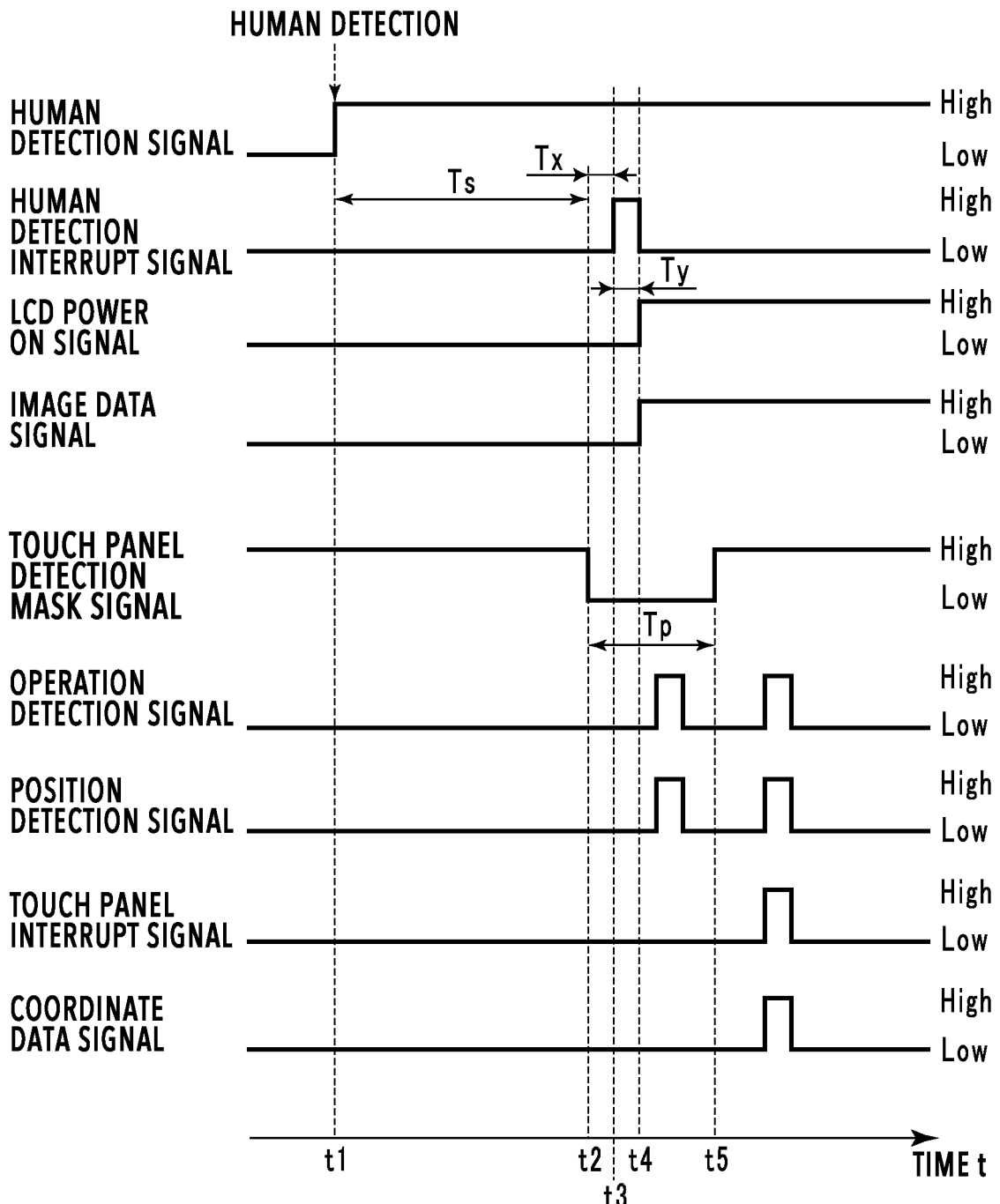
FIG. 6 is a diagram illustrating state transition of each signal according to Embodiment 1.

FIG. 6 is a diagram illustrating state transition of each signal according to the present embodiment. In the state transition diagram of FIG. 6, with the abscissa as time t, the rise (signal ON) and fall (signal OFF) of the signal are shown for each type of signals of FIG. 2.

At the timing t1, as the human detection sensor 30 detects an object such as a person, the human detection sensor control circuit 430 outputs the human detection signal to the operation control unit 410. The operation control unit 410 determines whether or not the object detected by the human detection sensor 30 is a user U who approaches the image forming apparatus 1 on the basis of the input human detection signal. According to the present embodiment, the operation control unit 410 determines that the object is the user U in a case where the human detection sensor 30 detects the object for a period of time Ts.

At the timing t2, the operation control unit 410 switches the touch panel detection mask signal from HIGH to LOW (signal off). As a result, the position detection signal input from the touch panel control circuit 440 is masked for a period of time Tp, so that the coordinate data signal to be originally transmitted to the main body control unit 110 is not output. Note that, according to the present embodiment, the period of time Tp corresponds to a predetermined time elapsing after it is determined that the user U approaches the image forming apparatus 1, and the image forming apparatus 1 returns to the normal power state. That is, a touch of the user U on the touch panel 500 becomes invalid immediately after the image forming apparatus 1 returns to the normal power state as well as a period of time during which the image forming apparatus 1 returns from the power saving state to the normal power state.

At the timing t3 after the touch panel detection mask signal is switched to OFF, and a period of time Tx elapses, the operation control unit 410 outputs the human detection interrupt signal to the main body control unit 110. The period of time Tx may be set to a very short time such as several milliseconds to several tens milliseconds.

At the timing t4 after the human detection interrupt signal is input, and a period of time Ty elapses, the main body control unit 110 outputs the ON signal to the LCD power control circuit 130 and outputs the image data signal to the display control circuit 120. In this case, in a case where there is no problem in the power sequence of the LCD 150, the power ON signal and the image data signal may be output simultaneously. However, in a case where the power sequence is set in advance, a time difference may be set between the output of the power ON signal and the output of the image data signal.

In a case where a user U touches the touch panel 500 with his finger or the like, the touch panel control circuit 440 outputs the operation detection signal and the position detection signal to the operation control unit 410. In this case, while the touch panel detection mask signal is set to OFF (period of time Tp), the operation control unit 410 receives a signal input from the touch panel control circuit 440, but does not output the touch panel interrupt signal and the coordinate data signal to the main body control unit 110.

Meanwhile, in a case where the operation detection signal is input before the human detection interrupt signal is input, the touch panel interrupt signal and the coordinate data signal are input to the main body control unit 110. As a result, the main body control unit 110 can recognize that the user U tries to return the image forming apparatus 1 from the power saving state to the normal power state in a case where the user U touches the touch panel 500 with his finger or the like.

Meanwhile, since the touch panel interrupt signal and the coordinate data signal are not input for a period of time Tp, the main body control unit 110 is not allowed to recognize that the user U tries to return the image forming apparatus 1 from the power saving state. At the timing t5 after a period of time Tp, the operation control unit 410 switches a touch panel mask signal to ON again, so that the touch panel interrupt signal and the coordinate data signal corresponding to the operation detection signal and the position detection signal input after the timing t5 are output to the main body control unit 110.

(Returning Process Sequence)

Figure 7:
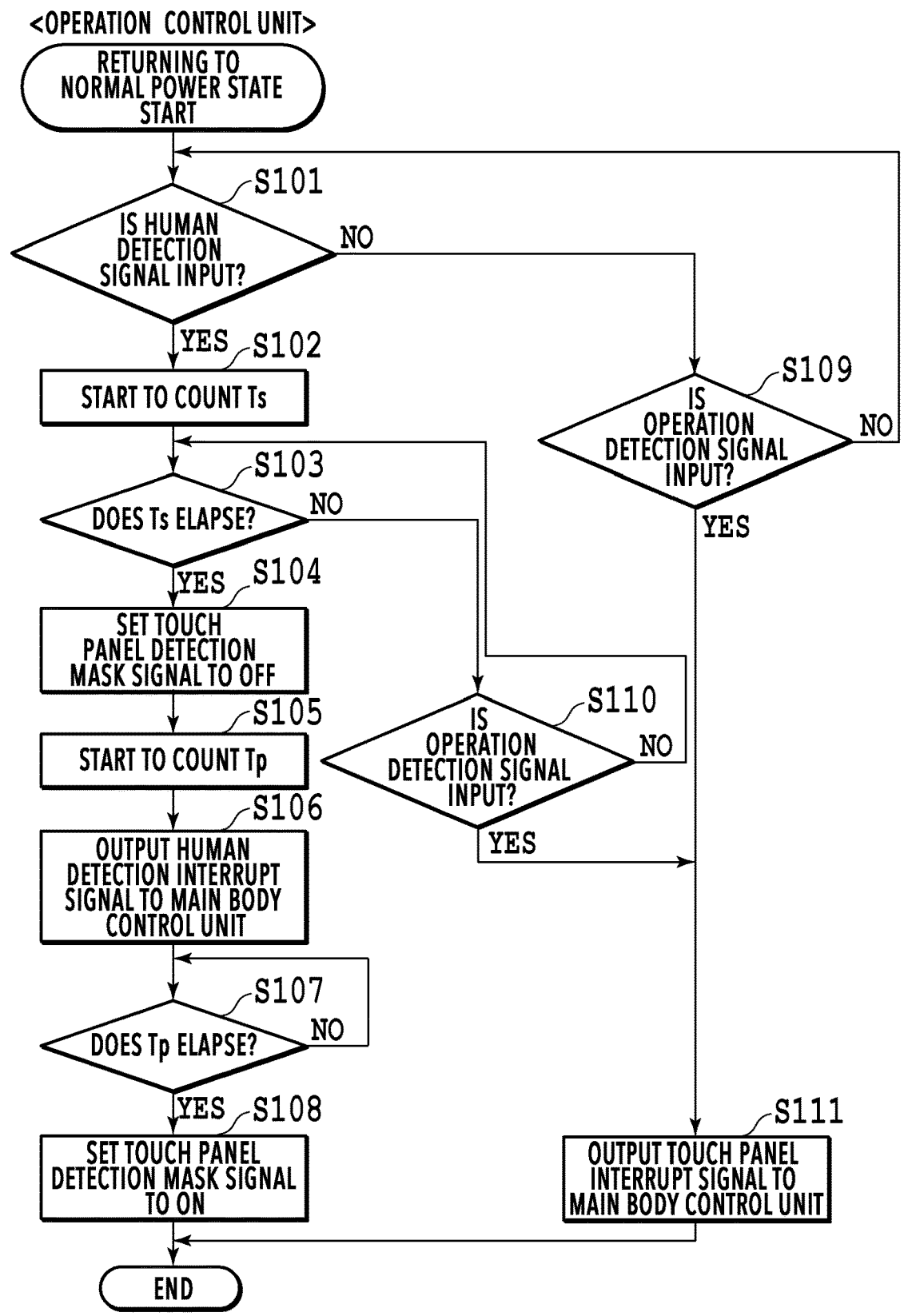
FIG. 7 is a flowchart illustrating a processing sequence for returning to the normal power state according to Embodiment 1.

FIG. 7 is a flowchart illustrating a returning process sequence executed in a case where the image forming apparatus 1 according to the present embodiment returns from the power saving state to the normal power state. The processing of the flowchart of FIG. 7 is performed in a case where the circuit of the operation control unit 410 executes a program code. In the following description, a symbol "S" denotes each step in the flowchart. This similarly applies to the flowchart of FIG. 9.

In S101, it is determined whether or not a human detection signal is input from the human detection sensor control circuit 430. That is, it is determined whether or not the human detection sensor 30 detects an object such as a person (t1). In a case where the human detection signal is input (S101: YES), the process advances to S102. In a case where no human detection signal is input (S101: NO), the process advances to S109.

In S102, the period of time Ts starts to be counted (t1).

In S103, it is determined whether or not the period of time Ts elapses. In a case where the period of time Ts elapses (S103: YES), the process advances to S104. In a case where the period of time Ts does not elapse (S103: NO), the process advances to S110. The period of time Ts is time necessary to determine whether or not the object such as a person detected by the human detection sensor 30 is a user U who approaches the image forming apparatus 1.

In S104, the touch panel detection mask signal is switched from ON to OFF (t2).

In S105, the period of time Tp starts to be counted (t2).

In S106, the human detection interrupt signal is output to the main body control unit 110 (t3).

In S107, it is determined whether or not the period of time Tp elapses. That is, it is determined whether or not a period of time for masking the touch panel interrupt signal and the coordinate data signal elapses. In a case where the period of time Tp elapses, the process advances to S108. In a case where the period of time Tp does not elapse, the process of S107 is repeated until the masking period elapses.

In S108, the touch panel detection mask signal is switched from OFF to ON (t5). As the touch panel detection mask signal is switched from OFF to ON (S108), the processing of this flowchart is terminated.

Meanwhile, in a case where it is determined that the human detection signal is not input in S101, it is determined whether or not the operation detection signal is input in S109. That is, it is determined whether or not a user U touches the operation unit 400 with his finger or the like. In a case where the operation detection signal is input (S109: YES), the process advances to S111. In a case where the operation detection signal is not input (S109: NO), such a signal input is continuously monitored until any one of the human detection signal or the operation detection signal is input thereafter.

In S111, the touch panel interrupt signal is output to the main body control unit 110 (t6). In this case, the touch panel interrupt signal and the coordinate data signal may be simultaneously output to the main body control unit 110. As the touch panel interrupt signal is output to the main body control unit 110 (S111), the processing of this flowchart is terminated.

In a case where it is determined that the period of time Ts does not elapse in S103 (S103: NO), it is determined whether or not the operation detection signal is input in S110. In a case where the operation detection signal is input (S110: YES), the process advances to S111. In a case where the operation detection signal is not input (S110: NO), the process returns to S103 again, and the processing of S103 and S110 is continuously repeated until the period of time Tp elapses, or the operation detection signal is input.

As described above, according to the present embodiment, in the image forming apparatus that recognizes two-channel returning factors including detection of the human detection sensor and detection of the touch panel, in a case where human presence is detected, an operation on the touch panel is invalidated for a predetermined period of time. In such a configuration, an operation input on the touch panel is not received immediately after the image forming apparatus returns to the normal power state. Therefore, the image forming apparatus does not start a process not intended by the user. That is, it is possible to suppress reduction of work efficiency in using the image forming apparatus.

Embodiment 2

Hereinafter, Embodiment 2 of the present invention will be described. Note that descriptions will be simplified or omitted for portions shared in common with Embodiment 1, and points characteristic of the present embodiment will be described.

(Control of Operation Unit)

Figure 8:
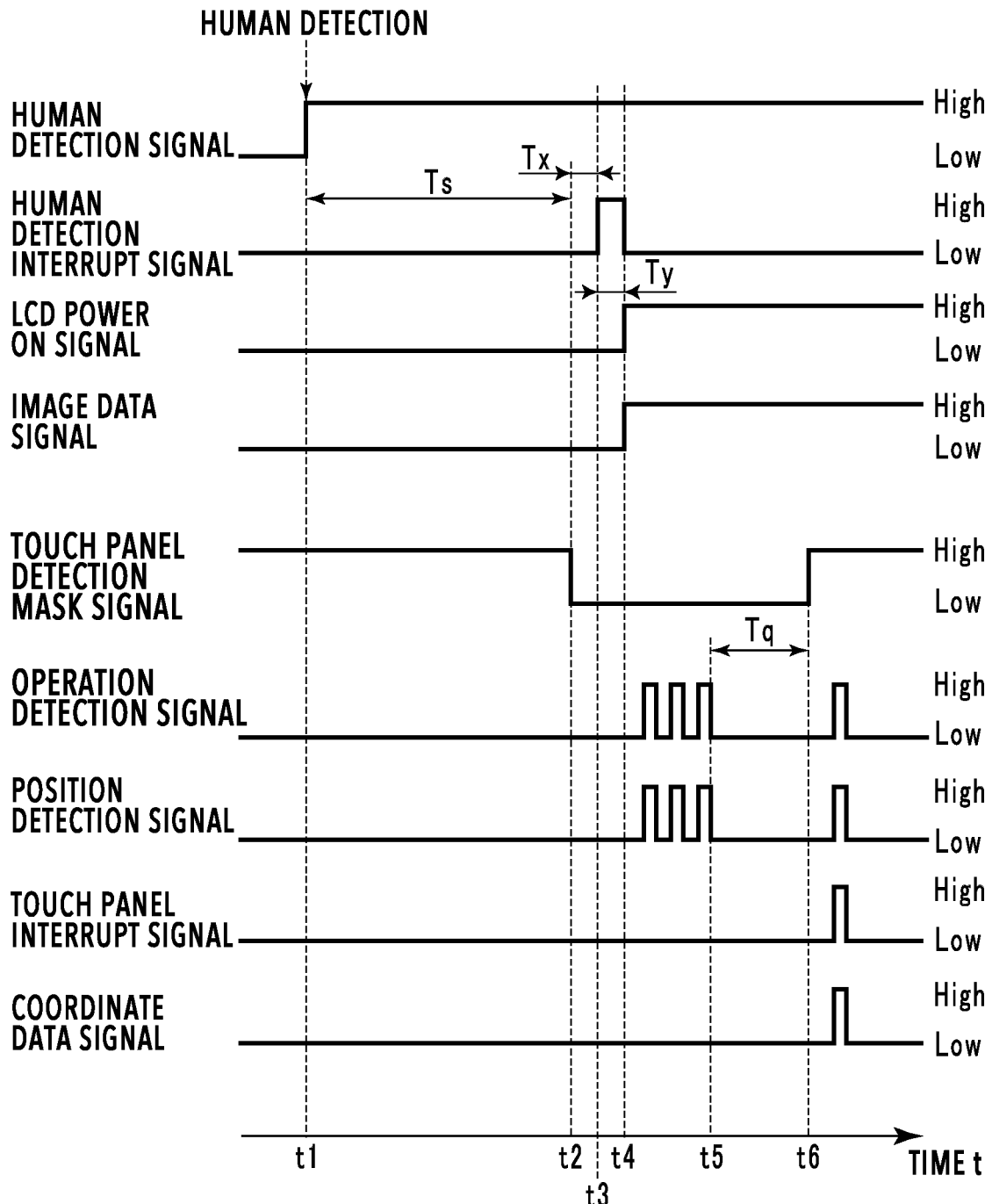
FIG. 8 is a diagram illustrating state transition of each signal according to Embodiment 2.

FIG. 8 is a diagram illustrating state transition of each signal according to the present embodiment. In the state transition diagram of FIG. 8, with the abscissa as time t, the rise (signal ON) and fall (signal OFF) of the signal are shown for each type of signals of FIG. 2. Note that the control blocks of the present embodiment are similar to those of Embodiment 1 (FIG. 2).

In Embodiment 1, the operation control unit 410 performs mask setting for a period of time Tp after the touch panel detection mask signal is switched from ON to OFF (t2). In comparison, according to the present embodiment, in a case where the operation detection signal is input at the time Tq, the operation control unit 410 restarts the counting of time Tq from the beginning, and cancels the mask setting in a case where the operation detection signal is not input at the time Tq. This is a control considering a use case where the user U repeatedly touches the touch panel 500 in order to return the image forming apparatus 1 from the power saving state. That is, in a case where the mask setting is canceled while the user U repeatedly touches the touch panel 500, an input to a button (such as the STOP button 563) displayed on the touch panel 500 immediately after the mask setting is canceled may be received. Then, the image forming apparatus 1 may execute a process in response to an operation not intended by the user. As described above, according to the present embodiment, it is possible to avoid an input to a button displayed on the touch panel 500 immediately after the mask setting is canceled from being received by extending counting of the period of time Tq while the user U repeatedly touches the touch panel 500.

At the timing t5, the operation control unit 410 determines whether or not the operation detection signal is input. In a case where the operation detection signal is input, the counting of the time Tq restarts from the beginning. As a result, a mask period for setting the mask is continuously extended until the counting of time Tq is terminated. For example, in a case where the user U repeatedly touches the touch panel 500 with his finger or the like, a masking state for the touch panel interrupt signal and the coordinate data signal output from the operation control unit 410 is continued for a period of time Tq. In addition, in a case where the operation detection signal is not input for the period of time Tq, the operation control unit 410 switches the touch panel detection mask signal from OFF to ON.

(Returning Process Sequence)

Figure 9:
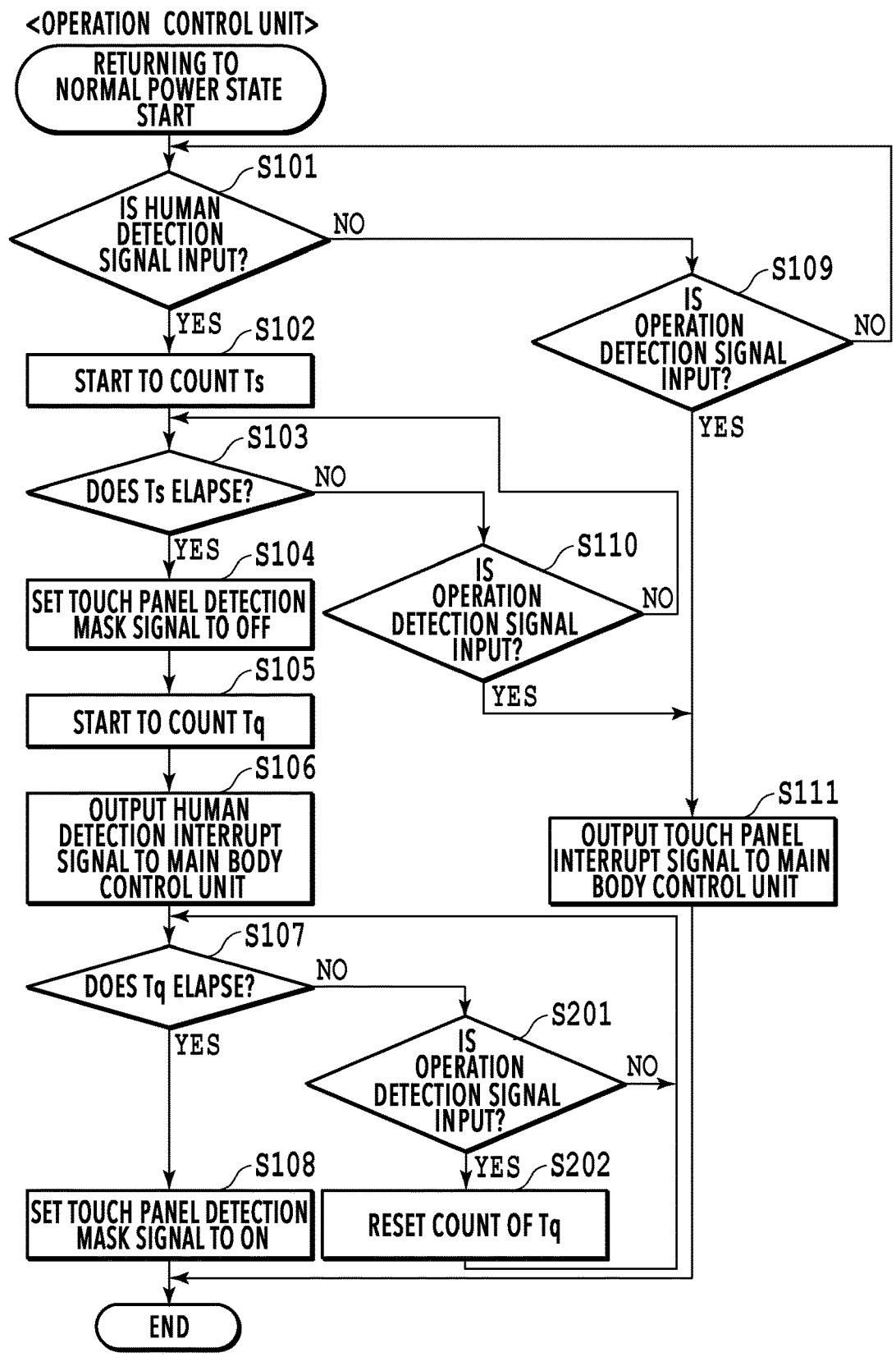
FIG. 9 is a flowchart illustrating a processing sequence for returning to the normal power state according to Embodiment 2.

FIG. 9 is a flowchart illustrating a returning process sequence executed in a case where the image forming apparatus 1 according to the present embodiment returns from the power saving state to the normal power state.

According to the present embodiment, in S107, it is determined whether or not the period of time Tq elapses. That is, it is determined whether or not a period of time for masking the output of the touch panel interrupt signal and the coordinate data signal elapses. In a case where the period of time Tq elapses, the process advances to S108. In a case where the period of time Tq does not elapse, the process advances to S201.

In S201, it is determined whether or not the operation detection signal is input. That is, it is determined whether or not a user U touches the operation unit 400 with his finger or the like. In a case where the operation detection signal is input (S201: YES), the process advances to S202. In a case where the operation detection signal is not input (S201: NO), the processing of S107 and S201 is continuously repeated until the period of time Tq elapses, or the operation detection signal is input.

In S202, the count of the period of time Tq (time counting) is reset, and the process returns to determination of S107 again. As the count of the period of time Tq is reset in S202, the count of the period of time Tq restarts from zero. In a case where it is determined that the period of time Tq elapses (S107: YES), the process advances to S108 out of the loop of S107 to S201.

In the flowchart of FIG. 9, the processes are similar to those of Embodiment 1 except for the determination process of S107 and the process of S201 to S202 (FIG. 7), and they will not be described repeatedly.

As described above, according to the present embodiment, it is possible to perform a control considering a use case where a user repeatedly touches the touch panel in the returning process of the image forming apparatus. This configuration prevents an operation input on the touch panel immediately after the image forming apparatus returns to the normal power state from being received. Therefore, it is possible to prevent the image forming apparatus from starting a process not intended by the user. That is, it is possible to suppress reduction of work efficiency in using the image forming apparatus.

Embodiment 3

Hereinafter, Embodiment 3 of the present invention will be described. Note that descriptions will be simplified or omitted for portions shared in common with Embodiments 1 and 2, and the points characteristic of the present embodiment will be described.

(Control of Operation Unit)

In the Embodiments 1 and 2, in a case where the human detection sensor 30 detects presence of a user U, the touch panel interrupt signal and the coordinate data signal are controlled not to be output for a predetermined period of time. In comparison, according to the present embodiment, the operation control unit 410 outputs the touch panel interrupt signal and the coordinate data signal to the main body control unit 110 regardless of detection of the human detection sensor 30. In addition, in a case where the human detection interrupt signal is input from the operation control unit 410, the main body control unit 110 performs the control such that the processing based on the touch panel interrupt signal and the coordinate data signal is not executed for a predetermined period of time. This will be described in detail with reference to FIG. 10.

Figure 10:
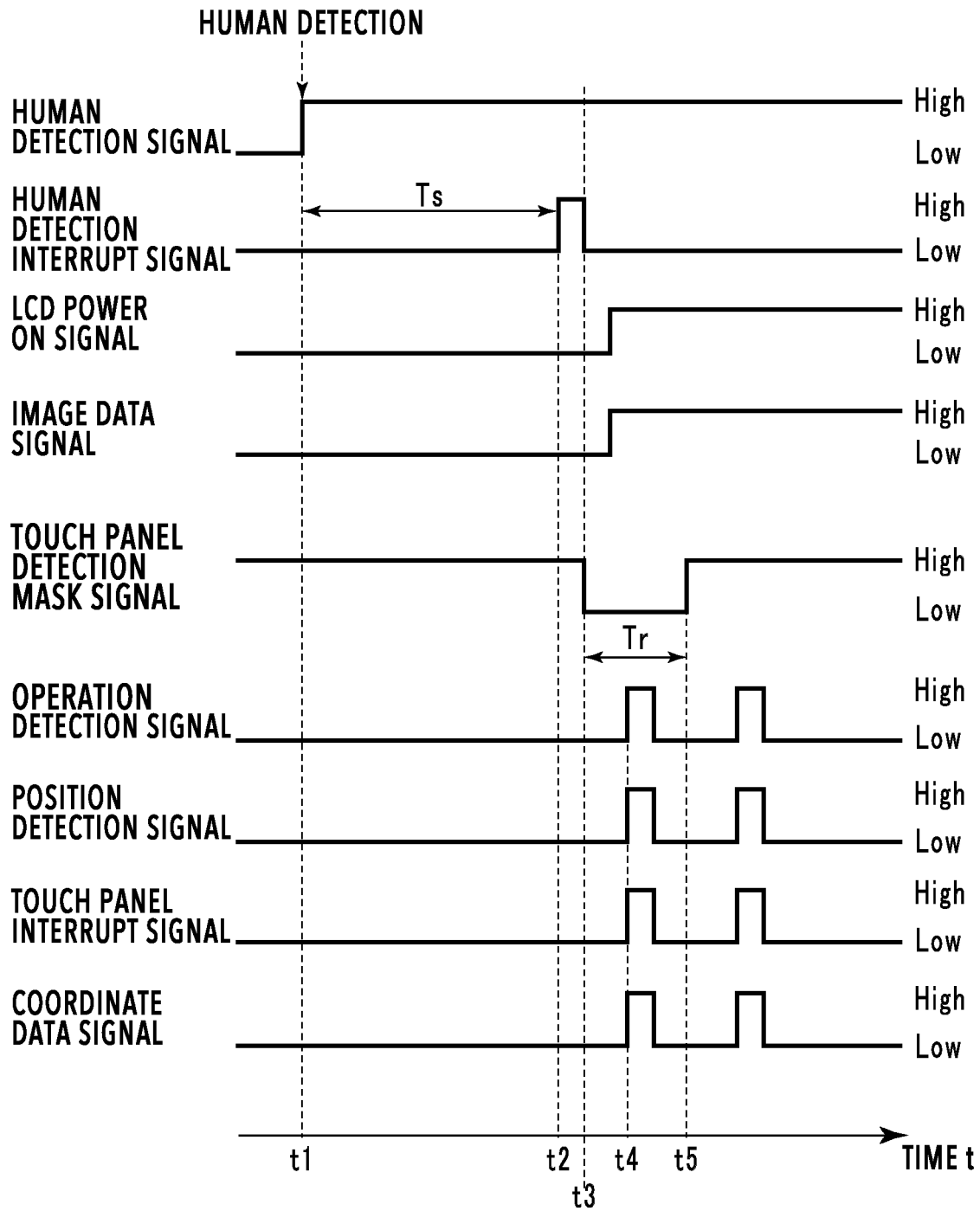
FIG. 10 is a diagram illustrating state transition of each signal according to Embodiment 3.

FIG. 10 is a diagram illustrating state transition of each signal according to the present embodiment. In the state transition diagram of FIG. 10, with the abscissa as time t, the rise (signal ON) and fall (signal OFF) of the signal are shown for each type of signals of FIG. 2. Note that the control blocks of the present embodiment are similar to those of Embodiment 1 (FIG. 2).

At the timing t2, the human detection interrupt signal is input from the operation control unit 410.

At the timing t3, in response to an input of the human detection interrupt signal, the main body control unit 110 switches the touch panel detection mask signal from HIGH to LOW (signal OFF). As a result, the touch panel interrupt signal and the coordinate data signal are invalidated for a period of time Tr (t4). Specifically, while the mask control is performed, the main body control unit 110 performs the control such that the ON signal corresponding to the coordinate data signal and the image data signal are not output to the LCD power control circuit 130 and the display control circuit 120, respectively.

After the period of time Tr elapses, at the timing t5, the main body control unit 110 switches the touch panel mask signal to ON again, so that invalidation of the touch panel interrupt signal and the coordinate data signal is canceled.

(Process Sequence)

Figure 11:
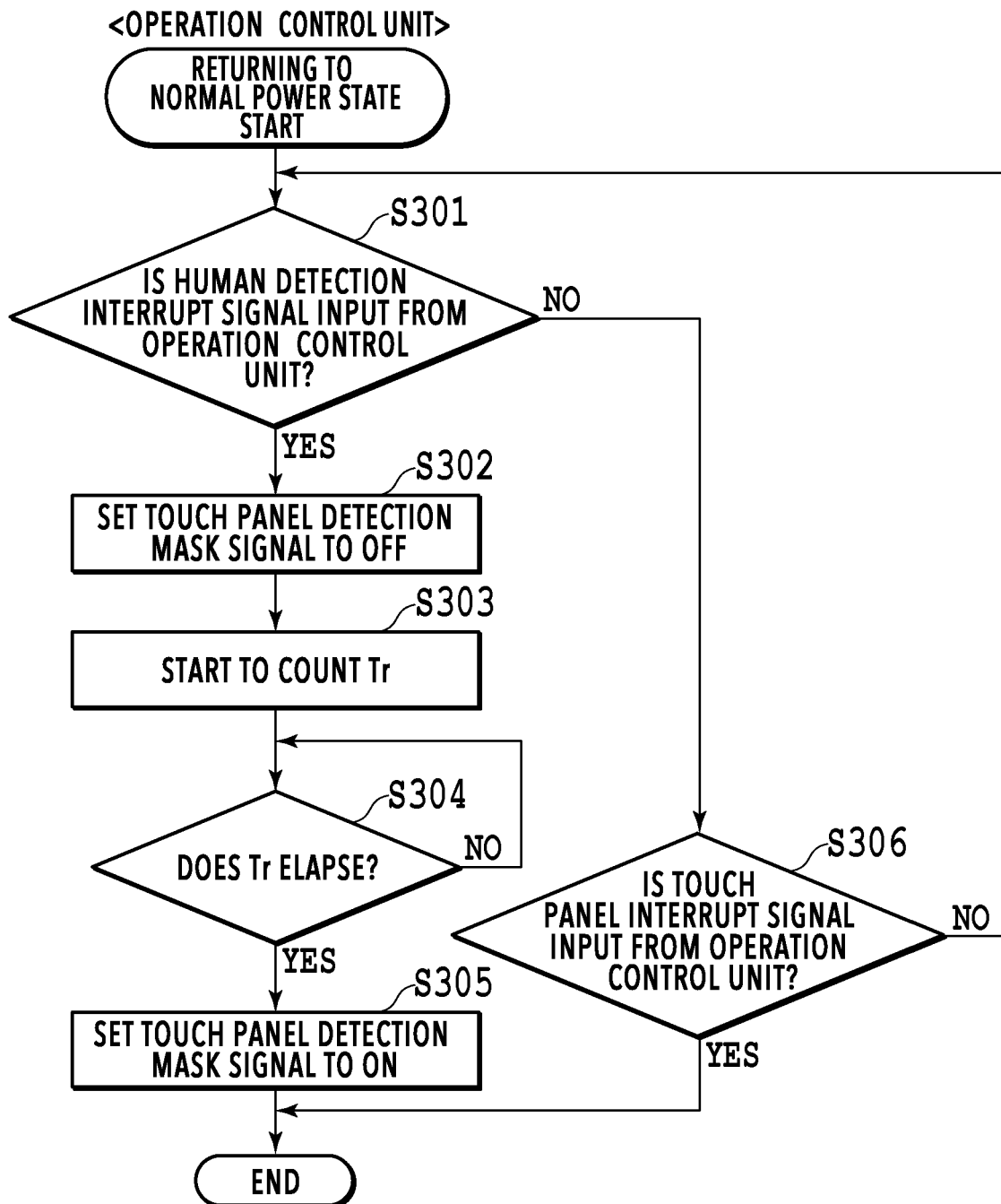
FIG. 11 is a flowchart illustrating a processing sequence for returning to the normal power state according to Embodiment 3.

FIG. 11 is a flowchart illustrating a returning process sequence executed in a case where the image forming apparatus 1 according to the present embodiment returns from the power saving state to the normal power state. The processing of the flowchart of FIG. 11 is performed in a case where the circuit of the main body control unit 110 executes a program code. In the following description, a symbol "S" denotes each step in the flowchart.

In S301, it is determined whether or not the human detection interrupt signal is input from the operation control unit 410 (t2). In a case where the human detection interrupt signal is input (S301: YES), the process advances to S302. In a case where the human detection interrupt signal is not input (S301: NO), the process advances to S306.

In S302, the touch panel detection mask signal is switched from ON to OFF (t3).

In S303, the period of time Tr starts to be counted (t3).

In S304, it is determined whether or not the period of time Tr elapses. That is, it is determined whether or not a period of time for invalidating the touch panel interrupt signal and the coordinate data signal elapses. In a case where the period of time Tr elapses, the process advances to S305. In a case where the period of time Tr does not elapse, the processing of S304 is repeated until the masking period elapses.

In S305, the touch panel detection mask signal is switched from OFF to ON (t5). In a case where any one of the human detection interrupt signal or the touch panel interrupt signal is input from the operation control unit 410 after S305, the main body control unit 110 outputs a signal necessary in the returning process of the image forming apparatus 1. Specifically, the main body control unit 110 outputs the ON signal to the LCD power control circuit 130 and outputs an image data signal for an initial screen displayed on the LCD 150 immediately after the returning to the display control circuit 120. In a case where the touch panel detection mask signal is switched from OFF to ON (S305), the processing of this flowchart is terminated.

Meanwhile, in a case where it is determined that the human detection interrupt signal is not input from the operation control unit 410 in S301, it is determined whether or not the touch panel interrupt signal is input from the operation control unit 410 in S306. That is, it is determined whether or not a user U touches the operation unit 400 with his finger or the like. In a case where the touch panel interrupt signal is not input (S306: NO), the process returns to S301 again, and the input of such an interrupt signal is continuously monitored until any one of the human detection interrupt signal or the touch panel interrupt signal is input from the operation control unit 410.

In a case where the touch panel interrupt signal is input (S306: YES), the main body control unit 110 outputs a signal necessary in the returning process of the image forming apparatus 1.

As the determination process of S306 is terminated, the processing of this flowchart is terminated. While the flowchart showing the returning process sequence according to the present embodiment has been described, a control considering a use case where a user repeatedly touches the touch panel may be executed by the main body control unit 110 as described above in Embodiment 2.

As described above, according to the present embodiment, the main body control unit 110 can invalidate the touch panel interrupt signal and the coordinate data signal input from the operation control unit 410 for a predetermined period of time. In such a configuration, in addition to the effects of Embodiment 1, it is possible to obtain an effect of improving freedom in design of each configuration (such as circuits) in the control blocks of FIG. 2.

Other Embodiments

In the aforementioned embodiments, in the image forming apparatus operated by switching between the normal power state and the power saving state, an example in which detection of the touch panel is invalidated in a case where detection of the human detection sensor is recognized as a returning factor has been described. In other examples, a target to which the method according to the present invention is applied is not limited to the image forming apparatus, but may be, for example, an information processing device such as a tablet or smart phone that switches between the normal state and the standby state in which the system waits for a user's operation by displaying a screen saver. In this case, in a case where the system advances from the standby state to the normal state in response to detection of the human detection sensor, the information processing device may be controlled such that the operation detection signal input in response to detection of the touch panel is invalidated for a predetermined period of time. In this configuration, it is possible to prevent the information processing device immediately after returning to the normal state from executing a process not intended by a user. Therefore, it is possible to suppress degradation of work efficiency in the information processing device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to obtain an effect of suppressing reduction of work efficiency in using the image forming apparatus that recognizes two-channel returning factors including detection of the human detection sensor and detection of the touch panel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-092382, filed May 8, 2017, which is hereby incorporated by reference wherein in its entirety.

What is claimed is:

1. An image forming apparatus comprising:
a human detection unit configured to detect a human;
a display unit configured to display a screen;
a user operation detection unit configured to detect a user operation to the display unit; and
a display control unit configured to change a screen on the display unit to another screen according to the user operation to the screen detected by the user operation detection unit and display a predetermined screen on the display unit based on a detection of the human by the human detection unit in a state that the display unit does not display the predetermined screen,
wherein the user operation detection unit detects the user operation to the predetermined screen and the display control unit does not change the predetermined screen to another screen during a predetermined period after the detection of the human by the human detection unit.

2. The image forming apparatus according to claim 1, wherein the predetermined period includes a period after the display unit displays the predetermined screen.

3. The image forming apparatus according to claim 1, further comprising a time-counting unit configured to count time for the predetermined period,
wherein, in a case where a user operation to the display unit is detected before the counting is terminated, the display control unit does not change the predetermined screen to another screen.

4. The image forming apparatus according to claim 1, wherein the display control unit receives a signal corresponding to the user operation from the user operation detection unit and does not output a signal relating to the received signal during the predetermined period.

5. The image forming apparatus according to claim 4, wherein the signal corresponding to the user operation is a coordinate data signal indicating a position where the user operation to the display unit.

6. The image forming apparatus according to claim 1, wherein the display control unit receives a signal corresponding to the user operation from the user operation detection unit and does not generate an image to be displayed on the display unit during the predetermined period.

7. The image forming apparatus according to claim 6, wherein the signal corresponding to the user operation is a coordinate data signal indicating a position where the user operation to the display unit.

8. A method of controlling an image forming apparatus, the method comprising:
   detecting a human by a human detection unit;
   displaying a screen by a display unit;
   detecting a user operation to the display unit by a user operation detection unit; and
   changing a screen on the display unit to another screen according to the user operation to the screen detected by the user operation detection unit and displaying a predetermined screen on the display unit based on a detection of the human by the human detection unit in a state that the display unit does not display the predetermined screen,
   wherein the user operation to the predetermined screen is detected by the user operation detection unit and the predetermined screen to another screen is not changed during a predetermined period after the detection of the human by the human detection unit.

9. An image forming apparatus comprising:
   a human sensor configured to detect a human;
   a display configured to display a screen;
   a touch panel configured to detect a user operation to the display; and
   a controller including one or more memory and one or more processor, configured to change a screen on the display to another screen according to the user operation to the screen detected by the touch panel and display a predetermined screen on the display based on a detection of the human by the human sensor in a state that the display does not display the predetermined screen,
   wherein the touch panel detects the user operation to the predetermined screen and the controller does not change the predetermined screen to another screen during a predetermined period after the detection of the human by the human sensor.

10. The image forming apparatus according to claim 9, wherein the predetermined period includes a period after the display displays the predetermined screen.

11. The image forming apparatus according to claim 9, further comprising a time-counter configured to count time for the predetermined period,
wherein, in a case where the user operation to the display is detected before the counting is terminated, the controller does not change the predetermined screen to another screen.

12. The image forming apparatus according to claim 9, wherein the controller receives a signal corresponding to the user operation from the controller and does not output a signal relating to the received signal during the predetermined period.

13. The image forming apparatus according to claim 12, wherein the signal corresponding to the user operation is a coordinate data signal indicating a position where the user operation to the display.

14. The image forming apparatus according to claim 9, wherein the controller receives a signal corresponding to the user operation from the controller and does not generate an image to be displayed on the display during the predetermined period.

15. The image forming apparatus according to claim 14, wherein the signal corresponding to the user operation is a coordinate data signal indicating a position where the user operation to the display.

16. The image forming apparatus according to claim 15, wherein the process based on the signal corresponding to the user operation includes a process of generating an image data signal for displaying an operation screen after transition corresponding to a position where the user operation to the display occurs.

17. The image forming apparatus according to claim 14, wherein the process based on the signal corresponding to the user operation includes at least one of a process of advancing the image forming apparatus from a second power state to a first power state, a process of shutting down the image forming apparatus, and a process of canceling image formation in the image forming apparatus.

* * * * *